(12) United States Patent
Yuan et al.

(10) Patent No.: US 7,719,972 B2
(45) Date of Patent: May 18, 2010

(54) METHODS AND APPARATUS FOR PROVIDING AN ADMISSION CONTROL SYSTEM IN A WIRELESS MESH NETWORK

(75) Inventors: Yuan Yuan, Greenbelt, MD (US); Liuyang L. Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1055 days.

(21) Appl. No.: 11/003,259

(22) Filed: Dec. 3, 2004

(65) Prior Publication Data

US 2006/0133272 A1    Jun. 22, 2006

(51) Int. Cl.
*H04L 12/28* (2006.01)
(52) U.S. Cl. ...................................... 370/230
(58) Field of Classification Search ......... 370/229–235, 370/310, 312, 328, 351, 389, 395.2, 395.21; 709/227–229
See application file for complete search history.

(56) References Cited

U.S. PATENT DOCUMENTS

| | | | |
|---|---|---|---|
| 6,577,613 B1 * | 6/2003 | Ramanathan | 370/337 |
| 6,859,463 B1 * | 2/2005 | Mayor et al. | 370/445 |
| 6,954,435 B2 * | 10/2005 | Billhartz et al. | 370/252 |
| 7,006,437 B2 * | 2/2006 | Ogier et al. | 370/230.1 |
| 7,068,600 B2 * | 6/2006 | Cain | 370/230.1 |
| 7,272,119 B2 * | 9/2007 | Rudnick et al. | 370/329 |
| 2002/0191573 A1 * | 12/2002 | Whitehill et al. | 370/338 |
| 2003/0108059 A1 * | 6/2003 | Yew et al. | 370/443 |
| 2003/0202469 A1 | 10/2003 | Cain | |
| 2004/0109428 A1 * | 6/2004 | Krishnamurthy | 370/338 |
| 2005/0135330 A1 * | 6/2005 | Smith et al. | 370/351 |
| 2006/0120387 A1 | 6/2006 | Yang | |

FOREIGN PATENT DOCUMENTS

WO    WO 02/05492 A    1/2002

OTHER PUBLICATIONS

PCT Search Report dated Mar. 22, 2006.

* cited by examiner

*Primary Examiner*—Dmitry H Levitan
(74) *Attorney, Agent, or Firm*—Schwabe, Williamson & Wyatt, P.C.

(57) ABSTRACT

Embodiments of methods and apparatus for providing an admission control system in a wireless mesh network are generally described herein. Other embodiments may be described and claimed.

27 Claims, 7 Drawing Sheets

| | 241 | 242 | 243 | 261 | 262 | 263 |
|---|---|---|---|---|---|---|
| Data Rate (B) | 2 | 2 | 2 | B1 | B2 | B3 |
| Capacity (C) | 10 | 30 | 30 | 10 | 30 | 30 |
| Transmitting node | 221 | 223 | 224 | 222 | 223 | 224 |
| Receiving node | 223 | 224 | 225 | 223 | 224 | 225 |

METHODS AND APPARATUS FOR PROVIDING AN ADMISSION CONTROL SYSTEM IN A WIRELESS MESH NETWORK

TECHNICAL FIELD

The present disclosure relates generally to wireless communication systems, and more particularly, to methods and apparatus for providing an admission control system in a wireless mesh network.

BACKGROUND

As wireless communication becomes more and more popular at offices, homes, schools, etc., the contentions for shared resources and dynamic channel conditions will cause network congestions and slowdowns. In particular, popular applications such as video and/or multimedia streaming contribute to the ever-increasing demand for bandwidth. To regulate the amount of data contending for available resources, a wireless communication network may implement an admission control policy. Typically, a node such as an access point (AP) may control traffic flows through that particular AP by requiring a station (STA) to provide traffic flow information including parameters such as data rate, delay bounds, packet size, etc. For example, the station may be a wireless electronic device such as a laptop computer, a handheld computer, a cordless or cellular telephone, a pager, a navigation device, a wireless peripheral (e.g., a keyboard), etc. Accordingly, the station may transmit an admission control request including the traffic flow parameters to the AP. In one particular example, the station may transmit an add traffic specification (TSPEC) (ADDTS) request as described in the 802.11e standard developed by the Institute of Electrical and Electronic Engineers (IEEE). Based on current conditions, the AP may accept or reject the admission control request by the station. If the AP accepts the admission control request, the station may transmit data via a link (e.g., a wireless medium (WM)) to the AP during a particular interval of time (e.g., a transmission opportunity (TXOP)).

The admission control scheme described above may be well suited for traffic flows from a station to an AP and vice versa. However, such an AP-station based configuration may not be adequate to control admission of traffic flows through a wireless multi-hop mesh network with distributed architecture. Thus, the amount of data contending for available resources associated with such wireless communication network requires a new regulatory and control mechanism to avoid performance degradations and/or overload conditions.

DETAILED DESCRIPTION

In general, methods and apparatus for providing an admission control system in a wireless mesh network are described herein. According to one example embodiment, an admission control system may be configured to determine whether a wireless multi-hop mesh network may support a traffic flow via a mesh route. For example, the traffic flow may be an audio stream, a video stream, a voice stream, a multimedia stream, and/or other suitable data stream. The mesh route may include one or more hops between two or more nodes of the wireless mesh network. Each hop may be associated with a transmitting node and a receiving node. The transmitting node may generate and transmit an admission control request associated with the traffic flow to the receiving node. The receiving node may identify a condition associated with admission of the traffic flow through the wireless mesh network via the mesh route. Accordingly, the receiving node may generate an admission control response indicative of the condition associated with admission of the traffic flow. Based on resources available to the wireless mesh network, the receiving node may either accept or reject the transmission from the transmitting node. The methods and apparatus described herein are not limited in this regard.

Figure 1:
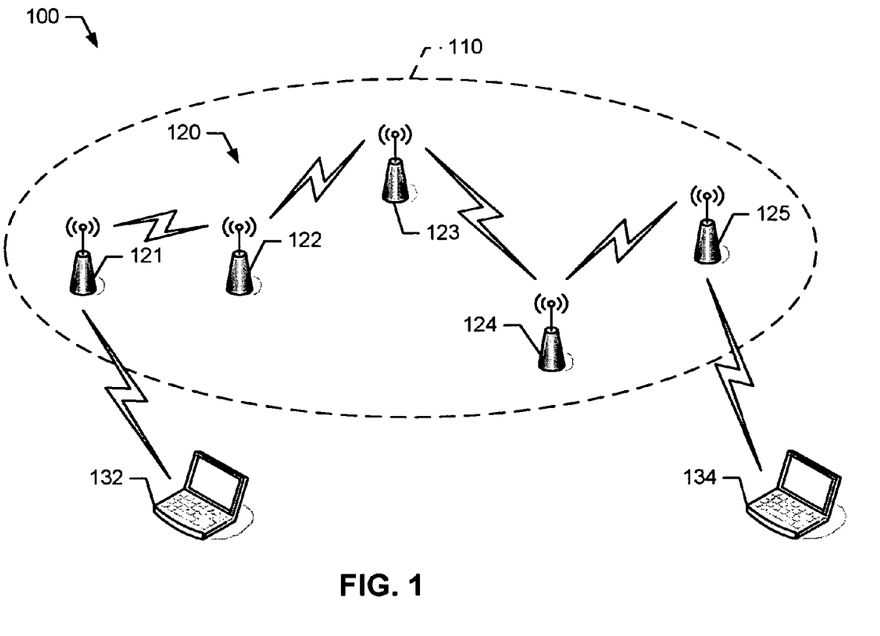
FIG. 1 is a schematic diagram representation of an example wireless communication system according to an embodiment of the methods and apparatus disclosed herein.

Referring to FIG. 1, an example wireless communication system 100 including a wireless mesh network 110 is described herein. The wireless mesh network 110 may include a plurality of nodes 120, generally shown as 121, 122, 123, 124, and 125. Although FIG. 1 depicts five nodes, the wireless mesh network 110 may include additional or fewer nodes. As described in detail below, the plurality of nodes 120 may include access points, redistribution points, end points, and/or other suitable connection points for traffic flows via mesh routes having multiple hops. Accordingly, the wireless mesh network 110 may be implemented to provide a wireless personal area network (WPAN), a wireless local area network (WLAN), a wireless metropolitan area network (WMAN), a wireless wide area network (WWAN), and/or other suitable wireless communication networks. In particular, the wireless mesh network 110 may provide communication services between two or more stations 130, generally shown as 132 and 134. For example, the two or more stations 130 may include a laptop computer, a desktop computer, a handheld computer, a tablet computer, a cellular telephone, a pager, an audio/video device (e.g., an MP3 player), a game device, a navigation device (e.g., a GPS device), a monitor, a printer, a server, and/or other suitable electronic devices.

The plurality of nodes 120 may be configured to operate in accordance with one or more of several wireless communication protocols to communicate with each other and/or the stations 130. In particular, these wireless communication protocols may be based on analog, digital, and/or dual-mode communication system standards such as the Global System for Mobile Communications (GSM) standard, the Frequency Division Multiple Access (FDMA) standard, the Time Division Multiple Access (TDMA) standard, the Code Division Multiple Access (CDMA) standard, the Wideband CDMA (WCDMA) standard, the General Packet Radio Services (GPRS) standard, the Enhanced Data GSM Environment (EDGE) standard, the Universal Mobile Telecommunications System (UMTS) standard, variations and evolutions of these standards, and/or other suitable wireless communication standards. The plurality of nodes 120 may also communicate with other components associated with the wireless mesh network 110 such as wireless local area network (WLAN) devices and/or wireless wide area network (WWAN) devices (not shown) including network interface devices and peripherals (e.g., network interface cards (NICs)), access points (APs), gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system.

The plurality of nodes 120 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate with each other. In particular, the plurality of nodes 120 may use OFDM modulation as described in the 802.xx family of standards developed by the Institute of Electrical and Electronic Engineers (IEEE) and/or variations and evolutions of these standards (e.g., 802.11x, 802.15, 802.16x, etc.) to communicate via the short-range wireless communication links with each other. The plurality of nodes 120 may also operate in accordance with other suitable wireless communication protocols that require very low power such as Bluetooth, Ultra Wideband (UWB), and/or radio frequency identification (RFID) to communicate with each other. The methods and apparatus described herein are not limited in this regard.

Figure 2:
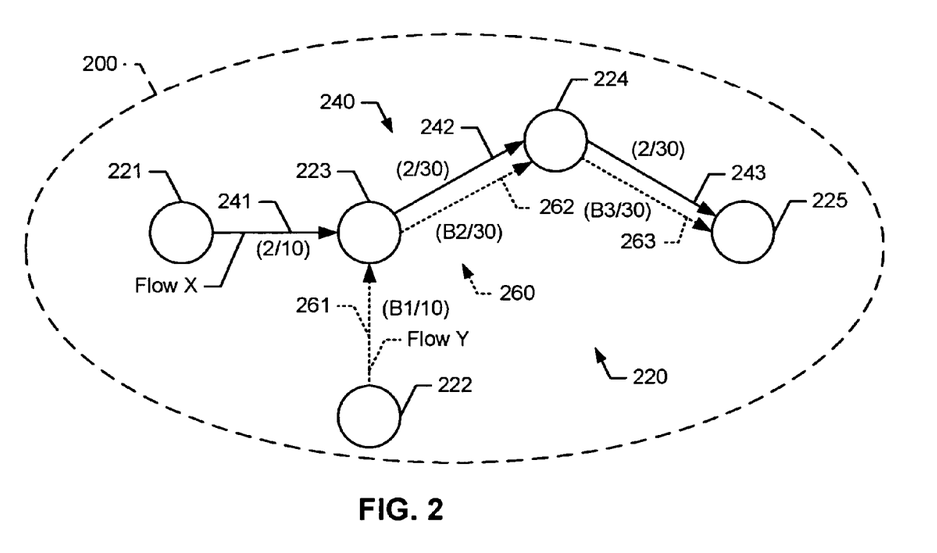
FIG. 2 is a block diagram representation of an example wireless mesh network.

In the example of FIG. 2, a wireless mesh network 200 may include a plurality of nodes 220, generally shown as 221, 222, 223, 224, and 225. Although FIG. 2 depicts five nodes, the wireless mesh network 200 may include additional or fewer nodes.

In the wireless mesh network 200, a traffic flow may propagate through multiple hops via a mesh route from a source node to a destination node. For example, an existing traffic flow (e.g., flow X) may propagate through the wireless mesh network 200 via a mesh route 240 including a first hop 241, a second hop 242, and a third hop 243 (e.g., propagate through the nodes 223, 224 from the node 221 to the node 225). Each hop associated with the plurality of nodes 220 may consume resources associated with the wireless mesh network 200. In particular, each hop along the mesh route 240 may require a particular data rate (e.g., an average bandwidth). For example, the first hop 241 from the node 221 to the node 223 may require a data rate of two megabits per second (Mbits/s) and the corresponding link (e.g., a wireless medium) may provide a bandwidth capacity of ten Mbits/s. The second hop 242 from the node 223 to the node 224 may require a data rate of two Mbits/s and the corresponding link may provide a bandwidth capacity of thirty Mbits/s. The third hop 243 from the node 224 to the node 225 may require a data rate of two Mbits/s and the corresponding link may provide a bandwidth capacity of thirty Mbits/s. Accordingly, Flow X via the mesh route 240 may require total data rate of ten Mbits/s out of a total bandwidth capacity of thirty Mbits/s (i.e., one-third of the total bandwidth capacity). Alternatively or in addition, each hop associated with the plurality of nodes 220 may require specific delay bounds for traffic flows such as voice streams, audio streams, etc.

In one example, a new traffic flow (e.g., Flow Y) may propagate through the wireless mesh network 200 via another mesh route 260 including a first hop 261, a second hop 262, and a third hop 263 (e.g., propagate through the nodes 223, 224 from the node 222 to the node 225). To determine whether to admit the new traffic flow, the plurality of nodes 220 may determine whether the wireless mesh network 200 has adequate resources to support existing traffic flows (e.g., Flow X) and the new traffic flow. In particular, each node along the mesh route 260 may perform an admission control test to determine whether the wireless mesh network 200 may support each hop of the mesh route 260. A source node of a traffic flow may initiate one or more admission control tests by generating an admission control request toward a destination node. Such a request may be routed downstream from the source node to the destination node to collection information associated with each link along a route identified by a routing component (not shown). The routing component may be any suitable routing module associated with mesh networking.

In one example, the node 222 may serve as a source node and the node 225 may serve as a destination node for Flow Y via the mesh route 260. Accordingly, the node 222 may initiate one or more admission control tests by generating and transmitting an admission control request packet toward the node 225. The admission control request packet may be routed from the node 222 to the next hop (e.g., the node 223). In particular, the admission control request may include resource reservation information associated with Flow Y via the first hop 261 (e.g., B1/10). The node 223 may append the resource reservation information associated with Flow Y via the second hop 262 (e.g., B2/30) into the admission control request packet from the node 222 and forward the appended packet to the next hop (e.g., the node 224). Similarly, the node may append the resource reservation information associated with Flow Y via the third hop 263 (e.g., B3/30) into the admission control request packet from the node 223 and forward the appended packet to the destination node (e.g., the node 225).

Figure 3:
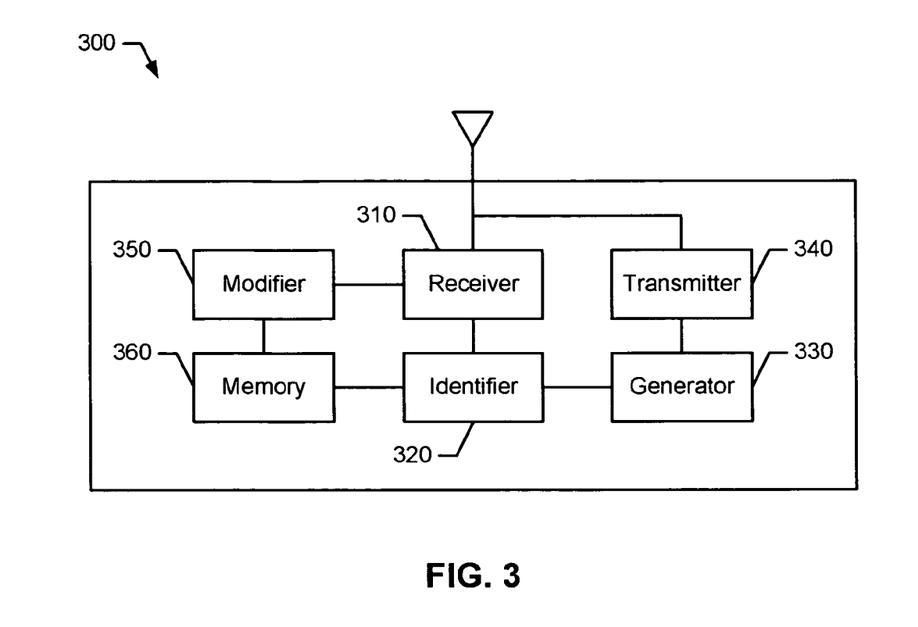
FIG. 3 is a block diagram representation of an example admission control system associated with the wireless mesh network of FIG. 2.

Each of the plurality of nodes 220 may include an admission control system (e.g., one shown as 300 in FIG. 3) to perform the admission control test. Turning to FIG. 3, an admission control system 300 may include a receiver 310, an identifier 320, a generator 330, and a transmitter 340. Briefly, the receiver 310 may be configured to receive an admission control request from a transmitting node. The identifier 320 may be configured to perform the admission control test. In particular, the identifier 320 may determine whether the corresponding node has adequate resources to support a hop of a mesh route associated with a traffic flow. Based on the result of the admission control test, the generator 330 may be configured to generate an admission control response to either accept or reject a transmission from the transmitting node. Accordingly, the transmitter 340 may be configured to transmit the admission control response to the transmitting node, which in turn, may process the traffic flow by performing the admission control test.

The admission control system 300 may also include a modifier 350, and a memory 360. The memory 360 may store a resource allocation table (RAT) (e.g., one shown as 400 in FIG. 4) used by the identifier 320 to perform the admission control test. For example, the resource allocation table 400 may provide information associated with resource usage by the plurality of nodes 220. As described in detail below, the modifier 350 may be configured to update the resource allocation table 400 based on the resource allocation information (RRI) received indirectly by the receiver 310 (e.g., overhear).

Following the above example, an admission control system of the destination node (e.g., the node 225) may perform a first admission control test associated with Flow Y via the mesh route 260 upon receiving (e.g., via the receiver 310) the admission control request packet with the resource reservation information associated the three hops 261, 262, and 263 of the mesh route 260 from the node 224. The admission control request from the node 224 may include resource reservation information associated with the first hop 261, the second hop 262, and the third hop 263. Thus, the node 225 may have information associated with the resource demand of the existing flows (e.g., Flow X) and the new flow (e.g., Flow Y). The resource reservation information may be stored in a resource allocation table (e.g., the resource allocation table 400 of FIG. 4). Based on the resource allocation table, the identifier 320 may determine an amount of resources allocated by the node 225 to existing traffic flows through the wireless mesh network 200 (e.g., Flow X). In particular, the identifier 320 may use the following equation (Equation 1) to determine if the resources required (R) by the new flow (e.g., Flow Y) may be accommodated by the node 225 after considering the resources reserved by existing flows (e.g., Flow X):

$$\sum_{l \in N(k,i)} R_l \le \left(1 - \sum_{j \in RAT(k)} R_j - \lambda\right),$$

in which RAT(k) is a set of entries for existing flows in the resource allocation table, N(k, i) is all the nodes along the mesh route a new flow i with an admission control request detectable by node k. Further, N(k, i) may be an estimation of the nodes within the new flow i being tested that may be contending for the same resources. The $\lambda$ is an estimation of resources consumed by one or more hidden traffic flows within an interference range of the hop but out of a transmission range of both the transmitting node and the receiving node of the hop. The $\lambda$ may be set to zero if the mesh network lacks hidden nodes. For each hop j, the resources required R may be determined based on B/C, in which B may indicate the data rate required by the traffic flow (e.g., an average bandwidth in Mbits/s or other suitable unit) and C may indicate the link capacity of the link corresponding to the hop from the transmitting node to the receiving node.

Referring back to FIG. 2, for example, an admission control system of the node 225 (e.g., the admission control system 300 of FIG. 3) may perform a first admission control test in response to receiving an admission control request from the node 224. The admission control request from the node 224 may include resource reservation information associated with the first, second, and third hops 261, 262 and 263 (e.g., an average bandwidth threshold associated with each of the first, second, and third hops 261, 262, and 263). The node 225 may detect the admission control request from the nodes 222, 223, and 224. Accordingly, the nodes 222, 223, and 224 may be within a common collision domain and therefore, contend for common shared resources.

Figure 4:
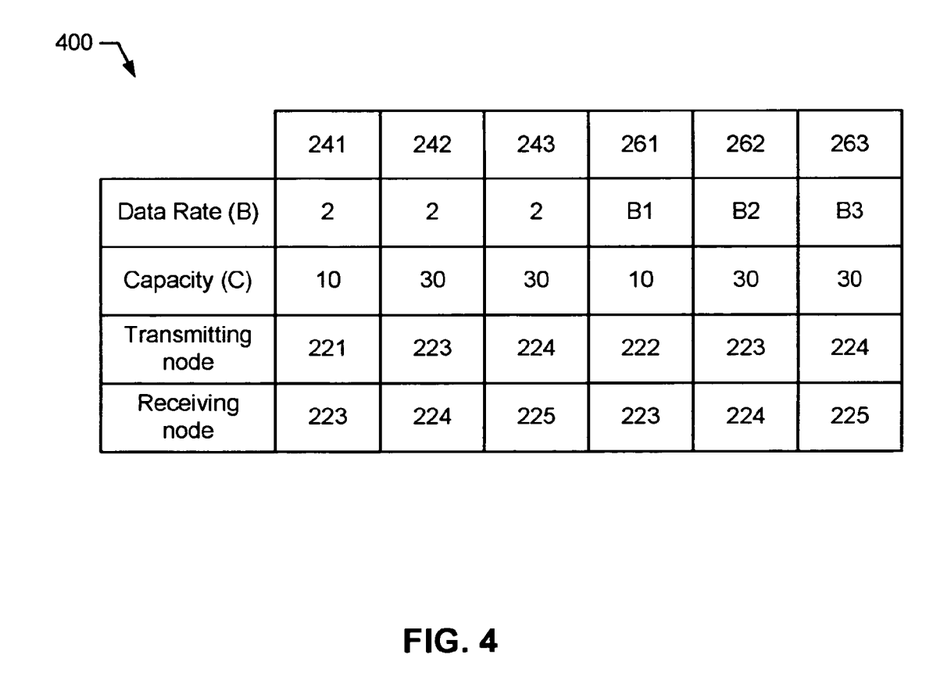
FIG. 4 depicts an example resource allocation table associated with the wireless mesh network of FIG. 2.

The resource reservation information from the nodes 222, 223, and 224 may be stored in the resource allocation table 400 of FIG. 4. Based on the resource allocation table 400 of FIG. 4, the admission control system associated with the node 225 (e.g., via the identifier 320) may determine an amount of resources allocated to existing flows by the nodes 223, 224, and 225 (e.g., Flow X via the mesh route 240). For example, the third hop 243 of the mesh route 240 may require a data rate of two Mbits/s and the corresponding link may have a bandwidth capacity of thirty Mbits/s (e.g., $R_{225}=2/30$). As noted in the above examples, the first hop 241 may require a data rate of two Mbits/s and the corresponding link may have a bandwidth capacity of ten Mbits/s (e.g., $R_{223}=2/10$), and the second hop 242 may require a data rate of two Mbits/s and the corresponding link may have a bandwidth capacity of thirty Mbits/s (e.g., $R_{224}=2/30$). Accordingly, the nodes 223, 224, and 225 allocated a total of ten Mbits/s out of a bandwidth capacity of thirty Mbits/s to the first, second, and third hops 241, 242, and 243 of the mesh route 240 (e.g., $R_X=2/10+2/30+2/30=10/30$). If the total average bandwidth of the first, second, and third hops 261, 262, and 263 of the mesh route 260 is twenty Mbits/s or less (e.g., if $R_Y \le 1-10/30=20/30$), the admission control system associated with the node 225 (e.g., via the generator 330) may generate an admission control response indicative of the node 225 being able to support the third hop 263. Thus, the wireless mesh network 200 may support Flow Y.

Following the above example, each of the average bandwidths B1 and B2 required by the first and second hops 261 and 262, respectively, is four Mbits/s. Thus, the node 225 may accept the transmission from the node 224 if the average bandwidth of the third hop 263 (B3) is four Mbits/s or less (e.g., 20/30−4/10−4/30=4/30). Otherwise if the total average bandwidth required the first, second, and third hops 261, 262, and 263 is more than twenty Mbits/s, the admission control system associated with the node 225 may generate an admission control response indicative of a lack of resources to support the third hop 263. Accordingly, the admission control system associated with the node 225 (e.g., via the transmitter 340) may transmit the admission control response indicative of the result from the first admission control test to the node 224.

In a reverse manner, the admission control response from the node 225 may be transmitted to the nodes 222, 223, and 224 along the mesh route 260. The admission control response packet may include the resource reservation information appended to the admission control request packet. The admission control response packet may also include a decision from an admission control test performed locally by the node 225. In a similar manner, an admission control system of the node 224 (e.g., the admission control system 300 of FIG. 3) may perform a second admission control test associated with the mesh route 260 in response to receiving an admission control response from the node 225. The node 224 may have a similar resource allocation table to the resource allocation table 400 of FIG. 4. If the node 224 detects the admission control requests from nodes 221, 222, 223, and 225, the resource allocation table at the node 224 may be identical to the resource allocation table at the node 225. Accordingly, the result of the admission control test performed locally at the node 224 may also be identical to the result of the admission control test performed locally at the node 225. However, if the node 224 fails to detect the admission control requests from one or more nodes in the mesh network 200 (e.g., the node 221), the resource allocation table at the node 224 may not include the resource reservation information associated with a hop from the node 221 (e.g., the hop 241). Thus, the result of the admission control test performed locally at the node 224 may be different from the result of the admission control test performed locally at the node 225. Based on the resource allocation table at the node 224, the admission control system associated with the node 224 (e.g., via the identifier 320) may determine whether the node 224 has sufficient resources to support existing flows (e.g., Flow X) and the new flow (e.g., Flow Y).

Likewise, an admission control system of the node 223 (e.g., the admission control system 300) may perform a third admission control test in response to receiving an admission control response from the node 224. The admission control response from the node 224 may include a decision on whether the node 224 accepts or rejects a transmission from the node 223. Following the above examples, the resource allocation table at the node 223 may include all the corresponding links that are within a common collision domain as the node 223. Based on the resource allocation table, the generator 330 may use Equation 1 to generate an admission control response indicative of the node 223 having adequate or inadequate resources to support Flow Y at the node 223.

The admission control systems associated with the plurality of nodes 220 may perform admission control tests associated with a mesh route in a variety of temporal sequences (e.g., in a concurrent manner or a sequential manner). For example, each of the admission control systems associated with the plurality of nodes 220 may perform an admission control test with partial resource reservation information prior to receipt of an admission control response from a receiving node and/or destination node. If the partial resource reservation information may indicate that a node has inadequate resources to support the new flow, the node may forward such a decision toward the source node without all resource reservation information from the admission control response to perform the admission control test.

In another example, the admission control systems associated with the plurality of nodes 220 may perform the admission control tests in a sequential manner as described below. If the Flow Y via the mesh route 260 passes the admission control test at the node 223, the admission control system associated with the node 223 may wait to transmit an admission control response to the node 222 (e.g., the source node) until the admission control systems associated with the node 224 has performed an admission control test. Likewise, if the Flow Y via the mesh route 260 passes the admission control test at the node 224, the admission control system associated with the node 224 may wait to transmit an admission control response until the admission control system associated with the node 225 has performed an admission control test. Accordingly, the node 225 (e.g., the destination node) may transmit a single admission control response to either accept or reject Flow Y via the mesh route 260 through the wireless mesh network 200.

While the components shown in FIG. 3 are depicted as separate blocks within the admission control system 300, the functions performed by some of these blocks may be integrated within a single semiconductor circuit or may be implemented using two or more separate integrated circuits. For example, although the receiver 310 and the transmitter 340 are depicted as separate blocks within the admission control system 300, the receiver 310 the receiver 310 may be integrated into the transmitter 340 (e.g., a transceiver). The methods and apparatus described herein are not limited in this regard.

Figure 5:
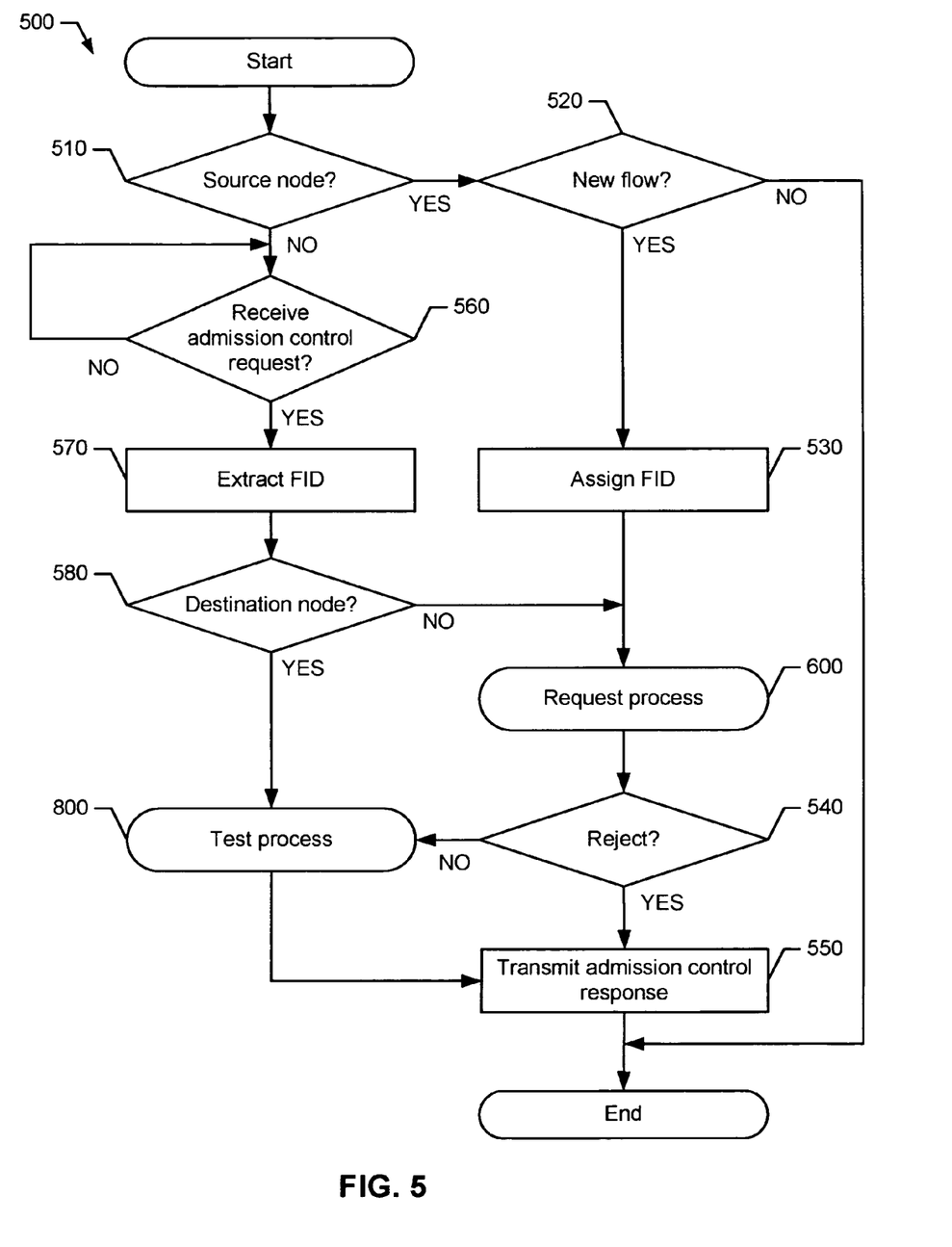
FIG. 5 depicts one manner in which the example admission control system of FIG. 3 may be configured to control admission of traffic flows.

FIG. 5 depicts one manner in which each of the plurality of nodes 220 of the example wireless mesh network 200 of FIG. 2 may be configured to control admission of traffic flows. The example process 500 of FIG. 5 may be implemented as machine-accessible instructions utilizing any of many different programming codes stored on any combination of machine-accessible media such as a volatile or nonvolatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in FIG. 5, these actions can be performed in other temporal sequences. Again, the example process 500 is merely provided and described in conjunction with the apparatus of FIGS. 1, 2, and 3 as an example of one way to configure a node to operate as one of the plurality of nodes 220.

In FIG. 5, the example admission control process 500 begins with an admission control system 300 associated with one of the plurality of nodes 220 (e.g., the node 222 of FIG. 2) determining whether that particular node is the source node of a traffic flow (block 510). If the node is a source node, the node may determine whether the traffic flow is a new flow (block 520). In one example, the node 222 may be the source node of Flow Y via the mesh route 260. Thus, the node 222 may determine whether Flow Y via the mesh route 260 is a new flow to the wireless mesh network 200. If the traffic flow is not a new flow (e.g., Flow X via the mesh route 240 of FIG. 2), the process 500 may terminate. Otherwise if the traffic flow is a new flow (e.g., Flow Y via the mesh route 260), the admission control system 300 may assign a flow identifier (FID) to the new flow (block 530). Accordingly, the admission control system 300 may proceed to the request process 600 as described in connection with FIG. 6.

Figure 6:
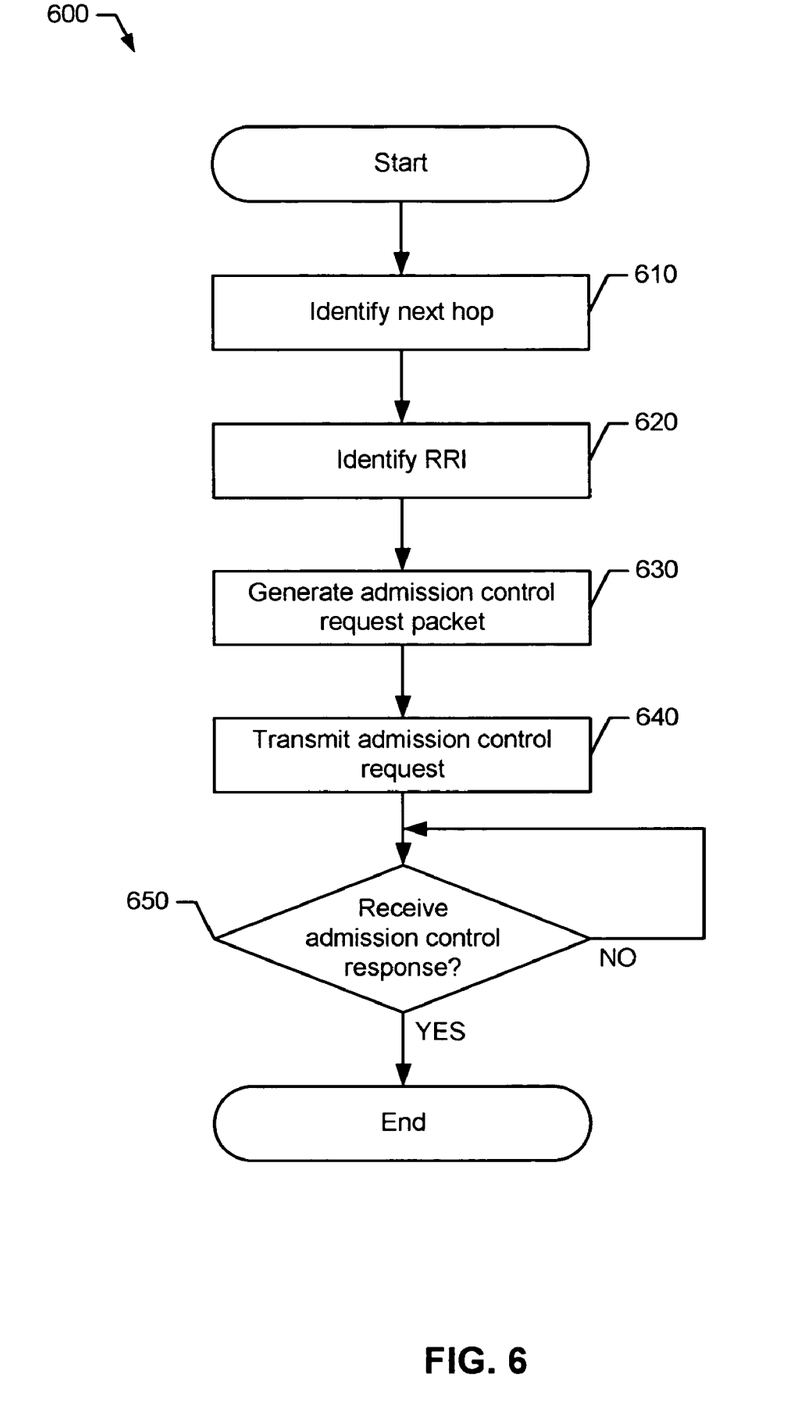
FIG. 6 depicts one manner in which the example admission control system of FIG. 3 may be configured to perform an admission control request process.

Turning to FIG. 6, the process 600 begins with a transmitting node identifying the next hop of the traffic flow to a receiving node via a mesh route (block 610). In one example, the node 222 may be the transmitting node and the node 223 may be the receiving node of the first hop 261. In another example, the node 223 may be the transmitting node and the node 224 may be receiving node of the second hop 262. In yet another example, the node 224 may be transmitting node and the node 225 may be the receiving node of the third hop 263. To determine whether the wireless mesh network 200 has resources available to support Flow Y via the mesh route 260, the transmitting node (e.g., the node 222) may generate an admission control request to the receiving node (e.g., the node 223). In particular, the transmitting node may identify resource reservation information associated with the hop as described in detail below (block 620).

Figure 7:
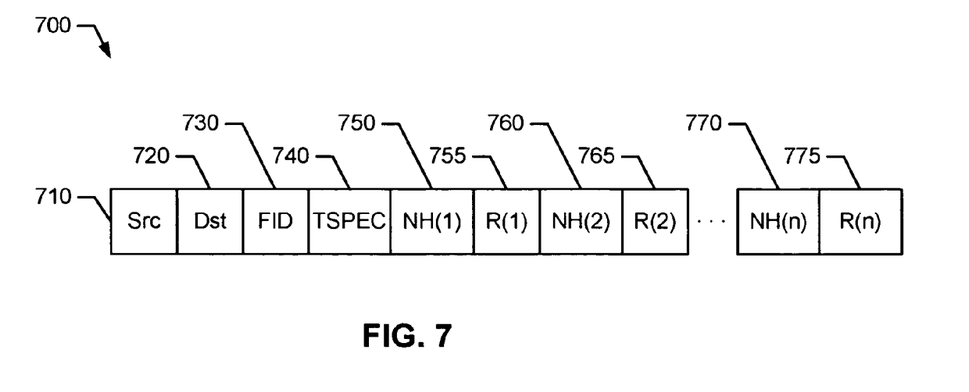
FIG. 7 is a block diagram representation of an example admission control request packet that may be used to implement the example admission control system of FIG. 3.

The transmitting node may generate an admission control request packet including the resource reservation information (block 630). Referring to FIG. 7, for example, an admission control request packet 700 may include a source address field (Src) 710, a destination address field (Dst) 720, a flow identifier field (FID) 730, and a traffic specification (TSPEC) field 740. The admission control request packet 700 may also include one or more next-hop address fields (NH), generally shown as 750, 760, and 770, and a resource required field (R) corresponding to each of the next-hop address fields, generally shown as 755, 765, and 775. In particular, the Src field 710 may identify the address of the source node associated with a traffic flow. For example, the Src field 710 may indicate the address of the node 222 for Flow Y via the mesh route 260. The Dst field 720 may identify the address of the destination node associated with a traffic flow. Following the above example, the Dst field 720 may indicate the address of the node 225 for Flow Y via the mesh route 260. The FID field 730 may indicate the flow identifier associated with a traffic flow. For example, the FID field 730 may be a number, a letter, and/or an alphanumeric identifier associated with a traffic flow. The TSPEC field 740 may indicate the specification defining the quality of service (QoS) requirements of a traffic flow (e.g., the IEEE 802.11e specification). For each hop of a mesh route, the NH field may identify the address of the receiving node (e.g., the next-hop address). For example, each transmitting node may use a mesh route table based on a mesh route algorithm to identify the next-hop address. Each transmitting node of the mesh route 260 may append the admission control request packet 700. In one example, the node 222 may append the admission control request packet 700 with the address of the node 223 (e.g., NH(1)). In turn, the node 223 may append the admission control request packet 700 with the address of the node 224 (e.g., NH(2)). The R field 740 may indicate the resource required based on B/C, in which B may indicate the data rate required by the hop from the transmitting node to the receiving node (e.g., Mbits/s) and C may indicate the bandwidth capacity of the link corresponding to the hop as described above in connection with FIG. 2. The methods and apparatus described herein are not limited in this regard.

Referring back to FIG. 6, the transmitting node may transmit an admission control request to the receiving node (e.g., downstream) (block 640). Along the mesh route 260, for example, the node 222 may transmit an admission control request to the node 223, which in turn, may transmit an admission control request to the node 224. The node 224 may also transmit an admission control request to the node 225. The admission control request may include an admission control request packet as described in detail above and in connection with FIG. 7. The transmitting node may monitor for an admission control response from the receiving node (block 650). For example, the node 222 may receive an admission control response from the node 223, which in turn, may receive an admission control response from the node 224. Likewise, the node 224 may receive an admission control response from the node 225. If the transmitting node receives an admission control response, the request process 600 may terminate.

Turning back to FIG. 5, the transmitting node may determine whether the receiving node has adequate resources to support a transmission from the transmitting node based on the admission control response (block 540). In one example, the node 222 may determine whether the node 223 has adequate resources to support the first hop 261 of the mesh route 260 based on the admission control response. In another example, the node 223 may determine whether the node 224 has adequate resources to support the second hop 262 of the mesh route 260. In yet another example, the node 224 may determine whether the node 225 has adequate resources to support the third hop 263 of the mesh route 260. If the admission control response indicates that the receiving node rejects the transmission, the transmitting node may proceed to forward the admission control response to a previous transmitting node along the mesh route to indicate that the new flow is being rejected (e.g., upstream) (block 550). For example, the node 222 may be a previous transmitting node relative to the node 223. Accordingly, the node 223 may forward the admission control response from the node 224 to the node 222 if the node 224 rejects the transmission from the node 223. Otherwise if the admission control response indicates that the receiving node accepts the transmission, the transmitting node may locally perform an admission control test as described in connection with FIG. 8. Following the above example, the node 223 may perform an admission control test if the node 224 accepts the transmission from the node 223.

Figure 8:
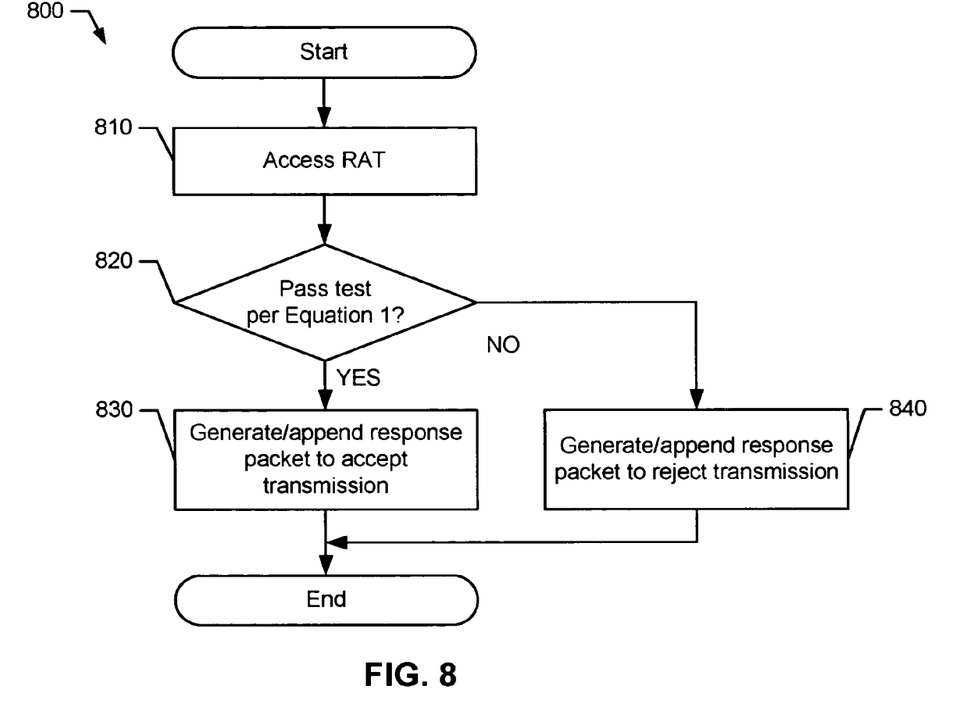
FIG. 8 depicts one manner in which the admission control system of FIG. 3 may be configured to perform an admission control test process.

Referring to FIG. 8, the process 800 begins with the receiving node retrieving resource reservation information associated with the wireless mesh network 200 to determine whether to accept or reject a transmission from a transmitting node (block 810). In particular, the receiving node may access the resource allocation table (e.g., the resource allocation table 400 of FIG. 4) to retrieve resource reservation information associated with the wireless mesh network 200. Based on the resource reservation information, the receiving node may determine (e.g., according to Equation (1)) whether the node has adequate resources to support the transmission from the transmitting node as described above in connection with FIG. 2. If the transmission passes the test, the receiving node may generate or append an admission control response packet (e.g., one shown as 900 in FIG. 9) to accept the transmission (block 830). Otherwise if the transmission fails the test, the receiving node may generate or append an admission control response packet to reject the transmission (block 840). The process 800 may terminate, and control may return to block 550 of the process 500.

Figure 9:
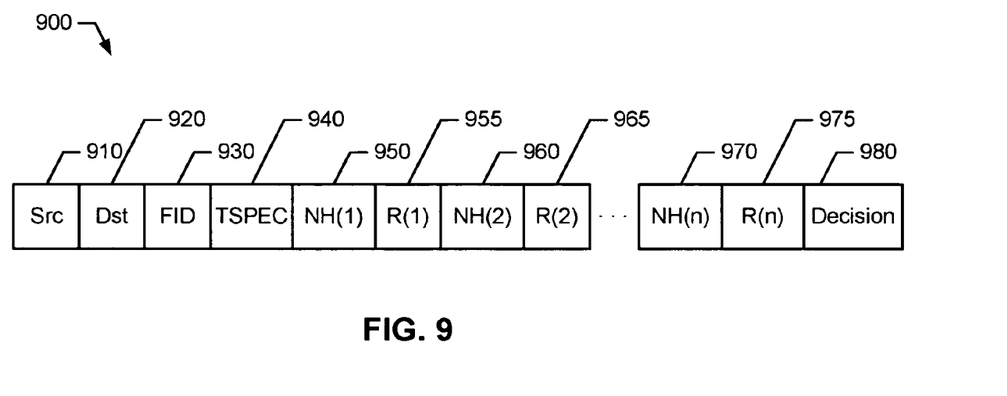
FIG. 9 is a block diagram representation of an example admission control response packet that may be used to implement the example admission control system of FIG. 3.

Similar to an admission control request packet (e.g., one shown as 700 in FIG. 7), the admission control response packet may include resource reservation information. In one example as shown in FIG. 9, an admission control response packet 900 may include a source address field (Src) 910, a destination address field (Dst) 920, a flow identifier (FID) field 930, and a traffic specification (TSPEC) field 940. The admission control response packet 900 may also include one or more next-hop address fields (NH), generally shown as 950, 960, and 970, and a resource required field (R) corresponding to each of the next-hop address fields, generally shown as 955, 965, and 975. These resource reservation fields are described above in connection with FIG. 7. The admission control response packet 900 may also include a decision field 980. The decision field 980 may indicate whether a transmission from a transmitting node passed the admission control test (e.g., either accept or reject the transmission). In one example, the decision field 980 may include a logic high (e.g., "1") to indicate that the receiving node accepts the transmission from the transmitting node or a logic low (e.g., "0") to indicate that the receiving node rejects the transmission from the transmitting node. The methods and apparatus described herein are not limited in this regard.

Turning back to block 510 of FIG. 5, if a node of the wireless mesh network 200 is not a source node, that particular node may monitor for an admission control request (block 560). For example, the node 223 may operate as a receiving node to monitor for an admission control request from other nodes of the wireless mesh network 200 (e.g., the node 221 and/or the node 222). If the receiving node fails to receive an admission control request, the receiving node may continue to monitor for an admission control request. Otherwise if the receiving node receives an admission control request, the receiving node may extract the FID from the admission control request packet associated with the admission control request (block 570). The receiving node may determine whether the node is a destination node (block 580). In one example, the node 225 is a destination node for Flow Y via the mesh route 260. If the receiving node is a destination node (e.g., the node 225), the receiving node may perform an admission control test as described above and in connection with FIG. 8.

Otherwise if a node is not a destination node, that particular node may serve as a transmitting node for the next hop along the mesh route. For example, neither the node 223 nor the node 224 is a destination node for Flow Y via the mesh route 260. Thus, the transmitting node may proceed to the request process 600 as described detail above and in connection with FIG. 6. Accordingly, the transmitting node may determine whether the admission control response packet from the request process 600 includes a decision to accept or reject the transmission (block 540). If the admission control response packet indicates that the receiving node accepts the transmission, the transmitting node may proceed to perform an admission control test as described in connection with FIG. 8. Accordingly, the transmitting node may transmit/forward the admission control response to the previous transmitting node (block 550). Otherwise if the admission control response packet indicates that the receiving node rejects the transmission, the transmitting node may proceed directly to block 550. As a result, the admission control response may be transmitted to the source node when the admission control request has been rejected or reached the destination node (e.g., a round trip from the source node to a receiving node rejecting the traffic flow or the destination node). By coordinating the nodes in such a manner, the plurality of nodes 220 may reduce signaling overhead and/or traffic through the wireless mesh network 200.

Figure 10:
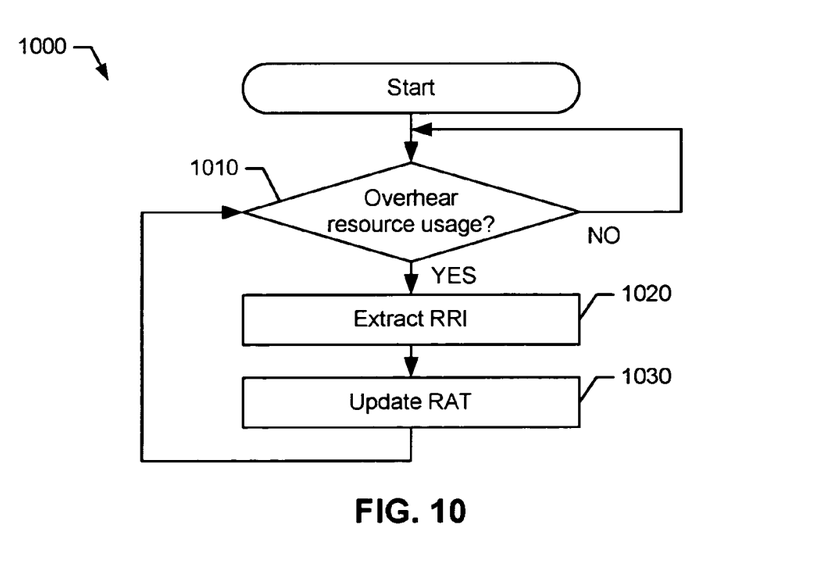
FIG. 10 depicts one manner in which the admission control system of FIG. 3 may be configured to monitor resource usage of the wireless mesh network of FIG. 2.

To account for dynamically changing conditions of the wireless mesh network 200, each of the plurality of nodes 220 may track or monitor for resource reservation information broadcasted by other nodes and update the resource allocation table (e.g., the resource allocation table 400 of FIG. 4). In FIG. 10, an example monitor process 1000 may begin with the admission control system 300 (e.g., via the receiver 310) of a node monitoring traffic flows that propagate through the wireless mesh network 200 (block 1010). In one example, the admission control system 300 associated with one of the plurality of nodes 220 may monitor for update messages that are broadcasted periodically by other nodes of the plurality of nodes 220. For example, the update messages may carry resource allocation information associated with a hop. Alternatively or in addition, the admission control system 300 may monitor for broadcast packets such as request-to-send (RTS)/clear-to-send (CTS) packets (e.g., one shown as 1100 in FIG. 11) and/or data/acknowledgement (ACK) packets with embedded resource allocation information (e.g., the resource allocation information is piggybacking onto the signaling packet(s)).

Figure 11:
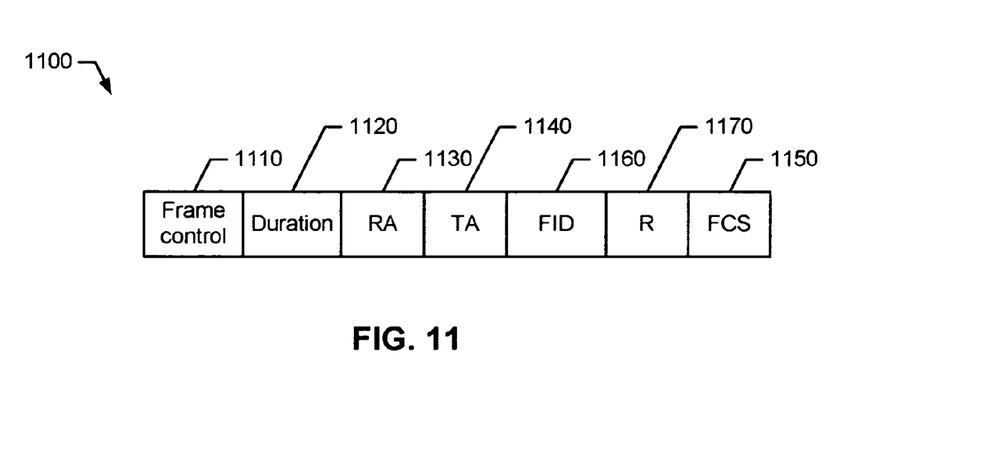
FIG. 11 is a block diagram representation of an example request-to-send (RTS)/clear-to-send (CTS) packet that may be used to implement the example admission control system of FIG. 3.

Referring to FIG. 11, for example, an RTS/CTS packet 1100 may include a frame control field 1110, a duration field 1120, a receiving node address (RA) field 1130, a transmitting node address (TA) field 1140, and a frame check sequence (FCS) field 1150. These standard-based signaling fields may be further defined by the specification of a particular standard (e.g., IEEE std. 802.11x). The admission control system 300 associated with each of the plurality of nodes 220 may embed resource allocation information associated with a hop into the RTS/CTS packet 1100. For example, the RTS/CTS packet 1100 may also include an FID field 1160 and an R field 1170. The FID field 1160 may indicate a flow identifier associated with a traffic flow. The R field 1170 may indicate an amount of resources required by the hop. Although a particular order of the fields is illustrated in FIG. 11, these fields may be aligned in other sequences in the CTS/RTS packet 1100.

Turning back to block 1010 of FIG. 10, if the admission control system 300 (e.g., via the receiver 310) fails to detect resource allocation information, the admission control system 300 may continue to monitor for resource allocation information. Otherwise if the admission control system 300 detects RRI, the admission control system 300 may extract resource allocation information (block 1020). Accordingly, the admission control system 300 (e.g., via the modifier 350) may modify or update the resource allocation table (e.g., one shown as 400 in FIG. 4) stored in the memory 360 so that the plurality of nodes 220 may use to determine whether the wireless mesh network 200 has the available resources to support a traffic flow.

Although the methods and apparatus disclosed herein are well suited for wireless mesh networks, the methods and apparatus disclosed herein are readily applicable to many other types of communication networks. For example, the methods and apparatus disclosed herein may be used to implement wireless personal area networks (WPANs), wireless local area networks (WLANs), wireless metropolitan area networks (WMANs), and/or wireless wide area networks (WWANs).

Figure 12:
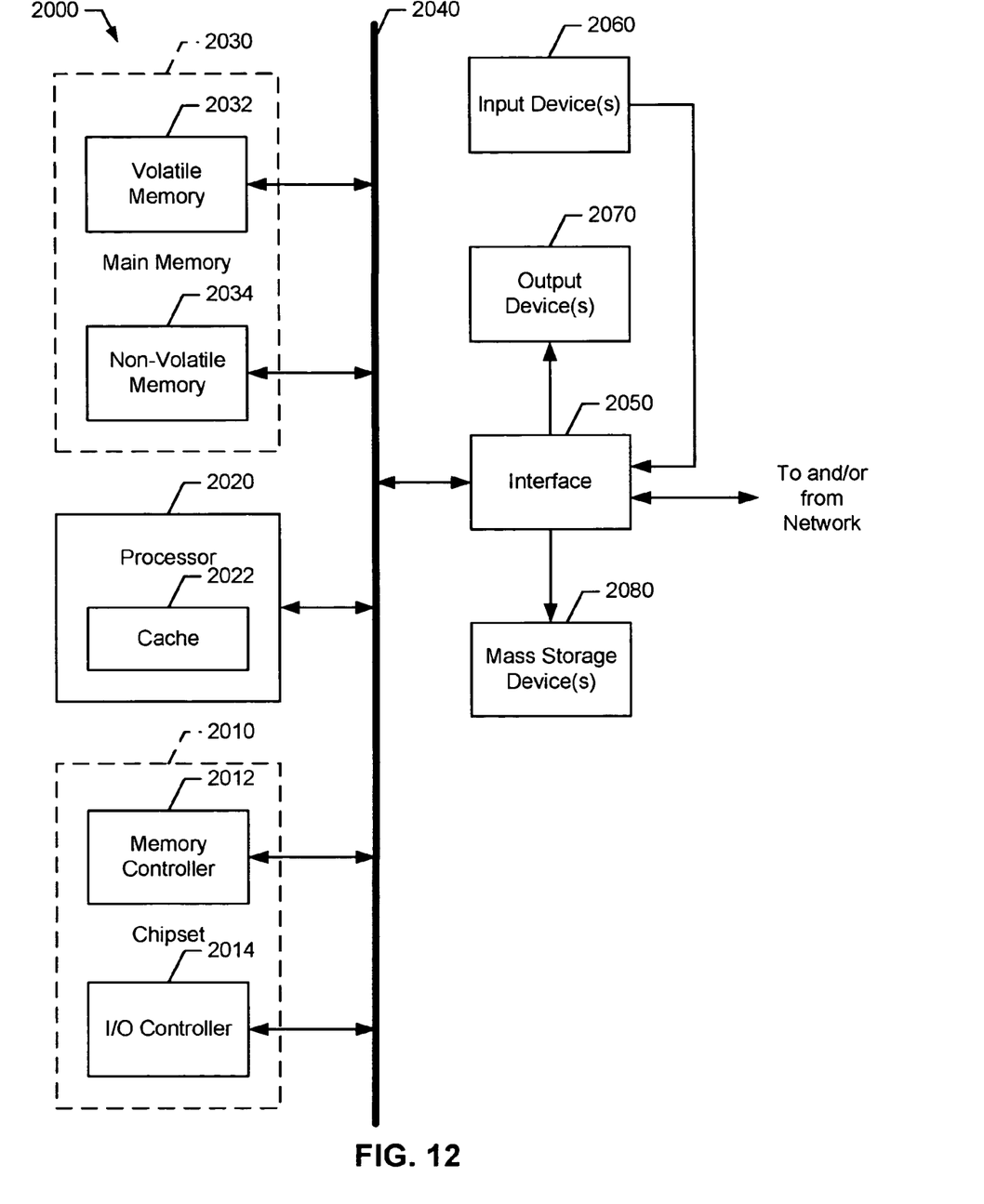
FIG. 12 is a block diagram representation of an example processor system that may be used to implement the example admission control system of FIG. 3.

FIG. 12 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 11 includes a chipset 2010, which includes a memory controller 2012 and an input/output (I/O) controller 2014. In particular, a chipset may provide memory and I/O management functions, as well as a plurality of general purpose and/or special purpose registers, timers, etc. that are accessible or used by a processor 2020. The processor 2020 is implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 includes a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 may permit an individual to enter data and commands into the processor 2020. For example, the input device(s) 2060 may be implemented by a keyboard, a mouse, a touch-sensitive display, a track pad or ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050, thus, typically includes, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 11 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
    receiving, at a first network node, a signaling message, which is a request-to-send (RTS) message, a clear-to-send (CTS) message, or an acknowledgment (ACK) message, having first resource allocation information, the signaling message sent from a second network node, the first resource allocation information indicating an amount of resources desired by a hop of a first traffic flow that was admitted to a wireless mesh network prior to the first network node receiving the signaling message and including an amount of resources, the first network node and the second network node being located within a common collision domain and contending for shared resources;
    receiving, at the first network node from a third network node, an admission control request associated with a second traffic flow that had not yet been admitted to the wireless mesh network prior to the first network node receiving the admission control request, the admission control request having second resource allocation information associated with the second traffic flow and the first and third network nodes being associated with the wireless mesh network;
    identifying, at the first network node, a condition associated with admission of the second traffic flow in response to receipt of the admission control request and based at least in part the first and second resource allocation information received in the signaling message and the admission control request, respectively; and
    generating an admission control response indicative of the condition associated with admission of the second traffic flow.

2. A method as defined in claim 1, wherein identifying the condition associated with admission of the second traffic flow comprises identifying a condition associated with one or more of a voice stream, an audio stream, a video stream, or a multimedia stream.

3. A method as defined in claim 1, wherein identifying the condition associated with admission of the second traffic flow is based at least further in part on a resource allocation table having information indicative of resources allocated to one or more traffic flows associated with the wireless mesh network.

4. A method as defined in claim 1, wherein generating the admission control response indicative of the condition associated with admission of the second traffic flow comprises generating one of an admission control response to accept the second traffic flow or an admission control response to reject the second traffic flow.

5. A method as defined in claim 1, wherein generating the admission control response indicative of the condition associated with admission of the second traffic flow comprises appending an admission decision to the admission control response.

6. A method as defined in claim 1, further comprising transmitting the admission control response from the first network node to the third network node.

7. A method as defined in claim 1, further comprising updating a resource reservation table information indicative of resources allocated to one or more traffic flows associated with the wireless mesh network.

8. The method of claim 1, wherein said signaling message is a CTS message or an ACK message.

9. The method of claim 1, further comprising:
    providing, by the first node, third and fourth resource allocation information in an RTS message and a CTS message, respectively.

10. The method of claim 1, wherein the signaling message is directed to a fourth network node by inclusion of a receiving node address that is associated with the fourth network node and not the first network node.

11. A machine-accessible medium including instructions, which when executed, causes a first network node to:

receive a signaling message, which is a request-to-send (RTS) message, a clear-to-send (CTS) message, or an acknowledgment (ACK) message, having first resource allocation information, the signaling message sent from a second network node, the first resource allocation information indicating an amount of resources desired by a hop of a first traffic flow that was admitted to a wireless mesh network prior to the first network node receiving the signaling message, the first network node and the second network node being located within a common collision domain and contending for shared resources;

receive, from a third network node, an admission control request associated with a second traffic flow that had not yet been admitted to the wireless mesh network prior to the first network node receiving the admission control request, the admission control request having second resource allocation information associated with the second traffic flow and the first network node and the third network node being associated with the wireless mesh network;

identify a condition associated with admission of the second traffic flow in response to receipt of the admission control request and based at least in part the first and second resource allocation information received in the signaling message and the admission control request, respectively; and generate an admission control response indicative of the condition associated with admission of the second traffic flow.

12. A machine-accessible medium as defined in claim 11, wherein the second traffic flow includes a voice stream, an audio stream, a video stream, and/or a multimedia stream.

13. A machine-accessible medium as defined in claim 11, wherein the instructions when executed causes the first network node to identify the condition associated with admission of the second traffic flow based at least further in part on a resource allocation table having information indicative of resources allocated to one or more traffic flows associated with the wireless mesh network.

14. A machine-accessible medium as defined in claim 11, wherein the instructions, when executed, causes the first network node to generate the admission control response indicative of the condition associated with admission of the second traffic flow by generating one of an admission control response to accept the second traffic flow or an admission control response to reject the traffic flow.

15. A machine-accessible medium as defined in claim 11, wherein the instructions, when executed, causes the first network node to generate the admission control response indicative of the condition associated with admission of the second traffic flow by appending an admission decision to the admission control response.

16. A machine-accessible medium as defined in claim 11, wherein the instructions, when executed, causes the first network node to transmit the admission control response to the third node.

17. A machine-accessible medium as defined in claim 11, wherein the signaling message is directed to a fourth network node by inclusion of a receiving node address that is associated with the fourth network node and not the first network node.

18. An apparatus comprising:

a receiver to receive a signaling message, which is a request-to-send (RTS) message, a clear-to-send (CTS) message, or an acknowledgment (ACK) message, having first resource allocation information, the signaling message sent from a first network node, the first resource allocation information indicating an amount of resources desired by a hop of a first traffic flow that was admitted to a wireless mesh network prior to the apparatus receiving the signaling message, the apparatus and the first network node being located within a common collision domain and contending for shared resources; and to receive, from a second network node, an admission control request associated with a second traffic flow that had not yet been admitted to the wireless mesh network prior to the first network node receiving the admission control request, the admission control request having second resource allocation information associated with the second traffic flow and the apparatus and the second network node being associated with the wireless mesh network;

an identifier to identify a condition associated with admission of the second traffic flow in response to receipt of the admission control request and based at least in part the first and second resource allocation information received in the signaling message and the admission control request, respectively; and a generator to generate an admission control response indicative of the condition associated with admission of the second traffic flow.

19. An apparatus as defined in claim 18, wherein the admission control response comprises one of an admission control response to support the second traffic flow or an admission control response to reject the second traffic flow.

20. An apparatus as defined in claim 18, wherein the generator is configured to append an admission decision to the admission control response.

21. An apparatus as defined in claim 18, further comprising a modifier to update a resource allocation table based on first and second resource reservation information.

22. An apparatus as defined in claim 18, wherein the apparatus is one or more of an access point, a redistribution point, or an end point.

23. The apparatus of claim 18, wherein the identifier is further configured to estimate resources consumed by one more traffic flows that are within an interference range of the apparatus or the second node but out of transmission range of both the apparatus and the second node; and identify the condition based at least in part on said estimate.

24. The apparatus of claim 18, wherein the identifier is configured to identify the condition based at least in part on whether:

$$\sum_{l \in N(k,i)} R_l \leq \left(1 - \sum_{j \in RAT(k)} R_j - \lambda\right),$$

where RAT(k) is a set of entries for existing flows in the resource allocation table, N(k,i) is all nodes along a mesh route with a new flow I with an admission control request detectable by node k, λ is an estimation of resources consumed by one more traffic flows that are within an interference range of the apparatus or the second node but out of transmission range of both the apparatus and the second node, $R_j$ is an amount of resources required for hop j and is determined based at least in part on a data rate and link capacity.

25. The apparatus of claim 18, wherein the signaling message is directed to a third network node by inclusion of a receiving node address that is associated with the third network node and not the first network node.

26. A method comprising:
receiving, at a first node, a signaling message, which is a request-to-send (RTS) message, a clear-to-send (CTS) message, or an acknowledgment (ACK) message, having resource allocation information, the signaling message sent from a second node, the first resource allocation information indicating an amount of resources desired by a hop of a first traffic flow that was admitted to a wireless mesh network prior to the first node receiving the signaling message, the first node and the second node being located within a common collision domain and contending for shared resources;

receiving, from a third node of a wireless mesh network, an admission control request associated with a second traffic flow that had not yet been admitted to the wireless mesh network prior to the first network node receiving the admission control request, the admission control request having second resource allocation information associated with the second traffic flow;

updating resource reservation information in a resource allocation table based at least in part on said first and second resource allocation information;

generating another admission control request by appending the admission control request with information based at least in part on the updated resource reservation information transmitting, to a fourth node of the wireless mesh network, the another admission control request; and receiving, from the fourth node, an admission control response that is indicative of a condition associated with admission of the second traffic flow.

27. The method of claim 26, further comprising performing an admission control test based at least in part on said receiving of the admission control response.

* * * * *